United States Patent [19]

Pump et al.

[11] 4,273,880

[45] Jun. 16, 1981

[54] FOAMED POLYETHYLENE FILMS

[75] Inventors: Wichard Pump, Mulheim an der Ruhr; Wolfgang Becker, Hilden; Edwin Woldenberg, Leverkusen, all of Fed. Rep. of Germany

[73] Assignee: Bayer Aktiengesellschaft, Fed. Rep. of Germany

[21] Appl. No.: 58,822

[22] Filed: Jul. 19, 1979

[30] Foreign Application Priority Data

Jul. 22, 1978 [DE] Fed. Rep. of Germany ....... 2832287

[51] Int. Cl.$^3$ ............................................. C08J 9/10
[52] U.S. Cl. ................................ 521/93; 264/DIG. 5; 521/79; 521/95; 521/143; 521/147; 521/908; 521/909

[58] Field of Search ................... 521/93, 79, 143, 147, 521/95

[56] References Cited

U.S. PATENT DOCUMENTS

| | | | |
|---|---|---|---|
| 3,017,371 | 1/1962 | Hohenberg et al. | 521/93 |
| 3,321,413 | 5/1967 | Riley, Jr. et al. | 521/93 |
| 3,461,087 | 9/1969 | Pritchard | 521/93 |
| 3,658,730 | 4/1972 | Takahashi et al. | 364/DIG. 5 |

*Primary Examiner*—Morton Foelak
*Attorney, Agent, or Firm*—Connolly and Hutz

[57] ABSTRACT

A process for the production of foamed films of polyethylene or ethylene vinyl acetate copolymers using metal salts of aliphatic fatty acids as additives.

4 Claims, No Drawings

FOAMED POLYETHYLENE FILMS

This invention relates to a process for the production of foamed polyethylene films using metal salts of aliphatic fatty acids.

Films of foamed polyethylenes and copolymers of ethylene/vinyl acetate are being increasingly used for the production of packaging and decorative material and as material for the manufacture of carrier bags.

Numerous processes for the production of foamed films are known. They differ from each other mainly in the foaming or blowing agents used. When so-called physical blowing agents are used, inert gases or low boiling solvents are introduced into the polymer melt under pressure by means of specially equipped extruders. The use of chemical blowing agents is preferred because the products can then be manufactured in conventional film blowing installations. Moreover, chemical blowing agents are easier to handle.

Among the numerous chemical blowing agents available on the market, azodicarbonamide has become firmly established for the foaming of polyethylene and ethylene/vinyl acetate copolymers because it has a suitable decomposition temperature which, moreover, can be adjusted as desired by means of additives, and because it has a high gas yield of about 200 ml of gas per gram of azodicarbonamide. In addition, azodicarbonamide and its decomposition products are physiologically harmless.

The use of azodicarbonamide as a blowing agent for the production of foamed films of polyethylene and copolymers of ethylene/vinyl acetate has, however, the disadvantage that, in the continuous extrusion of films in film blowing extruders, deposits tend to form on the depth of the screws and on the internal surfaces of the extrusion dies and heavy deposits of material (so called "beard formations") are formed on the lips of the extrusion die.

These two disturbances occur together since the latter is caused by the former, they result in a rough film surface (fish scale elevations) and streaks on the film in machine direction and film tearing due to occasional detachment of the "beard" from the die.

It was therefore an object of the present invention to prevent these disturbances in order to have a trouble-free continuous production of foamed films and improve the quality of the films which would otherwise be reduced by these disturbances.

The present invention therefore relates to a process for the continuous production of foamed films of polyethylene and/or copolymers of ethylene/vinyl acetate using azodicarbonamide as a blowing agent by known methods of tube extrusion, wherein from 0.4 to 2.5% by weight, based on the whole mixture, of a zinc salt of an aliphatic fatty acid and from 0.1 to 1.0% by weight, based on the whole mixture, of a calcium salt of an aliphatic fatty acid are added to the polyethylenes and/or copolymers of ethylene/vinyl acetate before or during processing of the foil or film.

The faults which occur in the production of films when azodicarbonamide is used can be overcome by using the salts according to the invention.

These disturbances cannot be overcome if only one component of the salt combination is used.

Particularly suitable zinc and calcium salts of the same or different aliphatic fatty acid are those of saturated or unsaturated fatty acids having from 8 to 20, preferably from 10 to 18 G-atoms, such as caprylic acid, lauric acid, stearic acid or oleic acid. Zinc stearate and calcium stearate and particularly preferred. Quantities of from 0.4 to 2.5% by weight, preferably from 1 to 1.5% by weight, based on the whole mixture, of the zinc salt, preferably of zinc stearate and from 0.1 to 1.0% by weight, preferably from 0.2 to 0.4% by weight, based on the whole mixture, of the calcium salt, preferably of calcium stearate are sufficient to overcome the disturbances in the continuous production of foamed films. Films which have been produced according to the invention using the preferred compounds mentioned above in the preferred proportions can even be used quite safely as packaging material for foodstuffs.

Ethylene homopolymers prepared by high pressure and/or low pressure polymerisation and ethylene/vinyl acetate copolymers generally containing from 1 to 15% by weight of vinyl acetate, preferably from 2 to 10% by weight of vinyl acetate, and mixtures thereof containing any proportion of ethylene homopolymer to ethylene/vinyl acetate copolymer can be used in the inventive process.

Azodicarbonamide is generally added to the polymers in quantities of from 0.1 to 2% by weight, preferably from 0.3 to 1.2% by weight, based on the whole mixture, either in the form of a concentrate blowing agent master batch or by application to the pellets with a drum mixer.

Other additives, such as antioxidants, UV-stabilizers, anti-blocking agents, slip agents anti-static agents, fillers and dyes may also be added to the mixture of polymer blowing agent and calcium and zinc salts, depending on the intended field of application.

According to the inventive process, the foamed films having a thickness of from 50 to 250 $\mu$m are produced by the conventional extrusion process of blown film, using an extruder with a blow head attached, generally at temperatures of from 130° to 250° C., preferably from 150° to 210° C. The foamed films are suitable for the use as packaging or decorative material or for carrier bags.

The parts given in the following Examples are parts by weight.

COMPARISON EXAMPLE 98 parts of an ethylene/vinyl acetate copolymer with a Vinyl acetate content of about 3.5% by weight, a density of 0.926 g/cm$^3$ and a melt index (190° C./21.2N) of 0.35 g/10 min, as slip agent about 400 ppm erucamide, and 2 parts of a blowing agent master batch consisting of 70 parts of low density polyethylene having a density of 0.923 g/cm$^3$ and a melt index of 3.5 g/10 min, and 30 parts of azodicarbonamide were mixed in a drum mixer for 20 minutes.

This mixture was workedup into a foamed film by means of a film blowing.

The extruder has a 3 zone screw, 20 mm diameter (D), 25 D length, compression ratio 1:3 and a blow head with an annular gap of 29 mm diameter and 0.8 mm width of gap.

The foamed film produced, which had a thickness of 100 $\mu$m, initially had a very uniform surface and fine cellular structure. After an extrusion time of about half an hour, a deposit was about to be formed on the inner and outer edge of the annular gap of the die, and irregular portions of this deposit were torn away by the film. At the same time, a fish scale-like surface roughness began to show on the film surface, and after an extrusion time of 4 hours the tubular film was torn. When the extruder was subsequently cleaned, a hard, grey-blue deposit which was difficult to remove was found on the internal surfaces of the die and on the screw depths.

EXAMPLE

A mixture was prepared as in the Comparison Example but with the addition of 0.5% of calcium stearate and 1.5% of zinc stearate in the drum mixer.

Extrusion was carried out as described in the Comparison Example.

The foamed film having a thickness of 100 μm had a uniform, fine cell structure and no surface markings. The surface of the film remained flawless over an extrusion time of 7 hours and no beard formation was found at the edges of the annular gap. When the extruder was taken apart, the internal surfaces of the die and the screw were found to be free from deposit.

We claim:

1. A process for the continuous production of foamed films of polyethylene and/or copolymers of ethylene/vinyl acetate using azodicarbonamide as a blowing agent by the known extrusion processes of blown film, wherein from 0.1 to 1.0% by weight of a calcium salt of an aliphatic fatty acid and from 0.4 to 2.5% by weight of a zinc salt of an aliphatic fatty acid are added to the polyethylenes and/or copolymers of ethylene/vinyl acetate before or during processing.

2. A process as claimed in claim 1, wherein the calcium and zinc salt used are the salts of the same or different saturated or unsaturated fatty acids having from 8 to 20 carbon atoms.

3. A process as claimed in claim 2, wherein the calcium and zinc salt used are calcium stearate and zinc stearate.

4. A process as claimed in claim 1, wherein from 1 to 1.5% by weight of the zinc salt and from 0.2 to 0.4% by weight of the calcium salt are used.

* * * * *